United States Patent
Tsou et al.

(10) Patent No.: US 9,963,553 B2
(45) Date of Patent: May 8, 2018

(54) ALTERNATING CRYSTALLINE-AMORPHOUS MULTIBLOCK COPOLYMER COMPOSITIONS AND METHODS OF PRODUCTION THEREOF

(71) Applicant: ExxonMobil Chemical Patents Inc., Baytown, TX (US)

(72) Inventors: Andy H. Tsou, Houston, TX (US); Kathryn L. Peretti, The Woodlands, TX (US); Shuji Luo, Basking Ridge, NJ (US); Dalia Yablon, Sharon, MA (US); Madhavi Vadlamudi, Clinton, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days. days.

(21) Appl. No.: 15/259,079

(22) Filed: Sep. 8, 2016

(65) Prior Publication Data
US 2017/0121467 A1    May 4, 2017

Related U.S. Application Data

(60) Provisional application No. 62/248,398, filed on Oct. 30, 2015.

(51) Int. Cl.
| | | |
|---|---|---|
| *C08G 81/02* | (2006.01) | |
| *C08J 5/18* | (2006.01) | |
| *C08L 23/06* | (2006.01) | |
| *C08L 87/00* | (2006.01) | |

(52) U.S. Cl.
CPC .............. *C08G 81/024* (2013.01); *C08J 5/18* (2013.01); *C08L 23/06* (2013.01); *C08L 87/005* (2013.01); *C08J 2323/06* (2013.01); *C08J 2353/00* (2013.01); *C08J 2453/00* (2013.01); *C08L 2207/062* (2013.01)

(58) Field of Classification Search
CPC ....... C08G 81/024; C08J 5/18; C08J 2323/06; C08J 2353/00; C08J 2453/00; C08L 23/06; C08L 87/005; C08L 2207/062
See application file for complete search history.

(56) References Cited

U.S. PATENT DOCUMENTS

2011/0178245 A1    7/2011   Peacock

FOREIGN PATENT DOCUMENTS

| WO | 95/27746 | 10/1995 |
|---|---|---|
| WO | 02/066540 | 8/2002 |
| WO | 2006/101966 | 9/2006 |
| WO | 2013/148035 | 10/2013 |

OTHER PUBLICATIONS

Trzaska, S.T. et al. Macromolecules vol. 33 pp. 9215-9221 (Nov. 17, 2000).*
Wu, Z. et al. Macromolecules vol. 27 pp. 6700-6703 (1994).*
Huang et al., "Dependence of Slow Crack Growth in Polyethylene on Butyl Branch Density: Morphology and Theory", Journal of Polymer Science: Part B: Polymer Physics, 1991, vol. 29, pp. 129-137.
Sakurai et al., "Blends of amorphous-crystalline block copolymers with amorphous homopolymers. Morphological studies by electron microscopy and small angle scattering", Polymer, 1996, vol. 37, No. 20, pp. 4443-4453.
Sequela et al., "Critical Review of the Molecular Topology of Semicrystalline Polymers: The Origin and Assessment of Intercrystalline Tie Molecules and Chain Entanglements", Journal of Polymer Science: Part B: Polymer Physics, 2005, 43, pp. 1729-1748.

\* cited by examiner

*Primary Examiner* — Irina S Zemel
*Assistant Examiner* — Jeffrey S Lenihan

(57) ABSTRACT

Alternating crystalline-amorphous polyolefin based multi-block copolymer compositions and methods for producing these multiblock copolymer compositions are disclosed. Also disclosed is the use of these multiblock copolymer compositions as additives to high density polyethylene (HDPE) resins in order to form polymer blends having improved ductility and toughness over that of the HDPE resins while retaining high mechanical strength, and the use of these polymer blends in films.

24 Claims, No Drawings

ALTERNATING CRYSTALLINE-AMORPHOUS MULTIBLOCK COPOLYMER COMPOSITIONS AND METHODS OF PRODUCTION THEREOF

CROSS-REFERENCE TO RELATED APPLICATIONS

This application claims priority to U.S. Provisional Application No. 62/248,398 filed Oct. 30, 2015, the disclosure of which is incorporated by reference in its entirety.

FIELD OF THE INVENTION

The present invention relates to alternating crystalline-amorphous polyolefin based multiblock copolymers, methods for production thereof, and the use of these multiblock copolymers as additives to high density polyethylene (HDPE) resins.

BACKGROUND OF THE INVENTION

Linear polyethylenes in general, and high density polyethylenes (HDPEs) in particular, have gained wide commercial use. In particular, these polymers are used extensively in blown film applications. HDPE's commercial success is due in part to its advantageous stiffness and mechanical strength properties resulting from its high degree of crystallinity, which is typically greater than 70%. However, HDPE has relatively low ductility and toughness properties, i.e., flexibility, because it forms uninterrupted stacks of folded chain crystals during crystallization, resulting in a large average crystallite size and few tie chains. HDPE's low flexibility leads to problems that are bothersome in various industrials applications, such as this material's proneness to splitting, stress cracking, and an accelerated creep rate.

Linear low density polyethylene (LLDPE) was first introduced commercially after HPDE and does not suffer from the same low flexibility limitations. LLDPE is produced by copolymerizing ethylene with a comonomer of 1-butene, 1-hexene, or 1-octene and has a comonomer content typically less than 20 wt %. The comonomers interrupt the ethylene chain, resulting in a reduced average crystallite size and the development of more tie chains relative to HDPE, in turn resulting in a ductile, tough material. However, the enhanced flexibility of LLDPE relative to HDPE comes at the expense of the mechanical strength properties of this material. For instance, because LLDPE has a tensile modulus four to five times less than that of HDPE, thicker LLDPE blown films are necessary to deliver the sufficient film stiffness in applications as HDPE. To date, there are no polyethylene materials that have both the high mechanical strength properties of HDPE and the enhanced ductility and toughness of LLDPE.

Because of these deficiencies in individual HDPE and LLDPE polymers alone, chemical modification of each of these polymers as well as blending of these and other materials have been attempted. For example, it is possible to blend LLDPE with stiff HDPE, and/or other stiff plastics (e.g., isotactic polypropylene (iPP)), and/or inorganic fillers (e.g., silica and talc) in order to raise the stiffness of the material and allow for down-gauging of LLDPE blown films. However, none of these materials are blended into LLDPE in common practice due to the inevitable losses in elongation and in impact strength of the material. Instead, high stiffness plastics such as HDPE, iPP, or PET, are commonly separately co-extruded with LLPDE so as not to weaken the resulting LLDPE film layer. However, multiple layer co-extrusion leads to an increase in manufacturing cost while the overall reduction in final laminated film thickness is limited due to the need of adhesive or compatibilizing layers.

Blends of HDPE with a class of polyolefin based multiblock copolymers comprising crystalline and amorphous blocks, known as "olefin block copolymers" (OBCs) for end applications requiring a high degree of toughness have also been attempted, for example, in US 2011/0178245. These OBC polymers are synthesized by chain shuffling catalyst technology and consist of crystallizable ethylene/alpha-olefin blocks (hard) with very low comonomer content and high melting temperature alternating with amorphous ethylene-octene blocks (soft) with high comonomer content. OBC polymers are also described in WO 2006/101966, among others. However, the resulting blends of OBCs with HDPE do not have both the high mechanical strength properties of HDPE and the flexibility of LLDPE, likely attributable to the facts that the block length, block number, the block transition, and the crystallite sizes in the hard blocks of OBC are ill defined due to statistical shuffling nature, time required to transition from hard to soft blocks, and the random insertion of 1-octene monomer.

Other references of interest include: WO 1995/027746A1; WO 2002/066540; and WO 2013/148035A1; and K. Sakurai et al. "Blends of amorphous-crystalline block copolymers with amorphous homopolymers. Morphological Studies by electron microscopy and small angle scattering," in 37(20) POLYMER 4443 (1996).

There is still a continuing need, therefore, for a polyethylene based material that has both the high mechanical strength properties of HDPE and the ductility and toughness, i.e., flexibility, of LLDPE.

SUMMARY OF THE INVENTION

The present invention fulfills the need for a polyethylene based material that combines the advantageous properties of both HDPE and LLDPE by providing a novel polyolefin based multiblock copolymer comprising alternating blocks of a crystalline high density polyethylene (HDPE) "A" and an amorphous polyolefin "B" that can be blended with HDPE resin to form a polymer blend having both high mechanical strength and enhanced ductility and toughness.

The invention relates to an alternating crystalline/amorphous polyolefin based multiblock copolymer and methods of producing the same. The multiblock copolymer comprises one or more blocks of a crystalline HDPE A comprising ethylene and one or more blocks of an amorphous polyolefin B comprising ethylene and an alpha-olefin. Typically, at least 90% of crystallites in the multiblock copolymer have a thickness of 15 nm or less.

The alternating crystalline-amorphous polyolefin based multiblock copolymer can be synthesized using a method comprising first coupling a polyolefin A prepolymer and a polyolefin B prepolymer via at least one of (i) click chemistry, (ii) condensation chemistry, and/or (iii) Williamson ether synthesis, and subsequently hydrogenating the coupled polyolefin A and polyolefin B prepolymers. Preferably, the polyolefin A prepolymer comprises polycyclooctene or polycyclopentene derived polymer segments, and the polyolefin B prepolymer comprises polybutadiene or polyisoprene derived polymer segments.

The invention further relates to a polymer blend comprising the alternating crystalline-amorphous polyolefin based multiblock copolymer and high density polyethylene (HDPE). Preferably, the multiblock copolymer is present at from 2.5 wt % to 60 wt % based on the weight of the polymer blend. Typically, at least 15% of crystallites in the polymer blend have a thickness of 15 nm or less. The invention further relates to a film having one or more layers, wherein at least one layer comprises the polymer blend.

DETAILED DESCRIPTION OF THE INVENTION

As used herein, "polymer" may be used to refer to homopolymers, copolymers, interpolymers, terpolymers, etc. Likewise, a copolymer may refer to a polymer comprising at least two monomers, optionally with other monomers.

As used herein, "polyolefin" refers to an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. A "mono-olefin" has one double bond, for example, an alpha, omega, pendant, or internal double bond.

As used herein, "multiblock copolymer" refers to a polymer comprising two or more chemically distinct regions or segments (also referred to as "blocks") preferably joined in a linear manner, rather than in pendent or grafted fashion.

As used herein, "number average block number" refers to the number average molecular weight (Mn) of an alternating crystalline-amorphous multiblock copolymer divided by half the average Mn of a single crystalline-amorphous unit of the copolymer.

As used herein, "weight average block number" refers to the weight average molecular weight (Mw) of an alternating crystalline-amorphous multiblock copolymer divided by half the average Mn of a single crystalline-amorphous unit of the copolymer.

As used herein, when a polymer is referred to as comprising a monomer or olefin, the monomer or olefin is present in the polymer in the polymerized form of the monomer or olefin or in the derivative form the monomer or olefin. Likewise, when catalyst components are described as comprising neutral stable forms of the components, it is well understood by one skilled in the art, that the ionic form of the component is the form that reacts with the monomers to produce polymers.

As used herein, "hydrocarbon" refers to molecules or segments of molecules containing primarily hydrogen and carbon atoms.

As used herein, "high density polyethylene (HDPE)" refers to an ethylene-containing polymer having a density of 0.940 g/cm$^3$ or higher.

As used herein, "linear low density polyethylene (LLDPE)" refers to a copolymer of ethylene and an alpha-olefin, such alpha-olefin generally having from 3 to 20 carbon atoms. Typically, the copolymer has a density of less than 0.940 g/cm$^3$.

As used herein, "degree of crystallinity" refers to the fractional amount of crystallinity in a polymer or polymer segment based on mass, as determined by calorimetry.

As used herein, "crystalline" refers to a polymer or polymer segment having a degree of crystallinity of 40% or more.

As used herein, "amorphous" refers to a polymer or polymer segment having a degree of crystallinity of 10% or less.

As used herein, "crystallite" refers to a small crystal within a crystalline region of a polymer.

As used herein, "lamella" refers to a crystallite having two dimensions much greater than a third dimension, for example, having a length and width much greater than its thickness.

As used herein, "interlamellar region" refers to an amorphous region between two lamellae of a polymer.

As used herein, "lamellar spacing" refers to the spacing between two lamellae in a polymer calculated by combining the thickness of a lamella with that of the interlamellar region.

As used herein, "tie chain" refers to a polymer chain that originates in one lamella, crosses the interlamellar region, and joins the first lamella with an adjacent lamella.

As used herein, "click chemistry" refers to a modular reaction scheme that is highly selective, has a high product yield, and can preferably be run under mild conditions.

Alternating Crystalline-Amorphous Polyolefin Based Multiblock Copolymer

The alternating crystalline-amorphous polyolefin based multiblock copolymers of this invention preferably comprise alternating blocks of a crystalline polyolefin A and an amorphous polyolefin B. Ideally, the multiblock copolymers comprise one or more crystalline-amorphous units, wherein each crystalline-amorphous unit is composed of a single crystalline A block and a single amorphous B block. Such a structure can be represented by the following formula:

$$(AB)_n$$

wherein n is an integer of at least 1, preferably greater than 1, such as 2, 3, 4, 5, 10, 15, 20, 30, 40, 50, 60, 70, 80, 90, 100, or higher. Ideally, n is 3.

The novel multiblock copolymers preferably have a weight average block number of greater than 3. Often, the weight average block number can range from a low of about 5, 10, or 15, to a high of about 20, 30, or 40. The novel multiblock copolymers preferably have a number average block number ranging from 2 to 10, more preferably from 2 to 6.

The novel multiblock copolymers typically comprise a plurality of crystallites within the one or more crystalline blocks. Preferably, at least 90%, more preferably 95%, and ideally 99% of the crystallites of the multiblock copolymer have a thickness of 15 nm or less, more preferably 13 nm or less, ideally 11 nm or less.

The novel multiblock copolymers of this invention are preferably produced by obtaining or synthesizing a polyolefin A prepolymer and a polyolefin B prepolymer, coupling the polyolefin A and polyolefin B prepolymers, and hydrogenating the coupled prepolymers.

The resulting inventive multiblock copolymers are useful as additives to an HDPE resin to form a polymer blend having improved ductility and toughness over that of the resin while retaining its high mechanical strength properties. Without wishing to be bound by theory, it is believed that the multiblock copolymers described herein, act as a template for the average crystallite size in the HDPE resin when these materials are co-crystallized, thereby resulting in the HDPE resin having a reduced average crystallite size and developing more tie chains. It is further believed that this reduction in the average crystallite size and the development of more tie chains in the HDPE resin accounts for the improved ductility and toughness of the resulting polymer blend while allowing the blend to retain the high mechanical strength properties associated with HDPE.

Crystalline Polyolefin A Block(s)

Preferably, the crystalline polyolefin A block(s) of the multibock copolymer comprise ethylene derived monomer units, ideally HDPE. Preferably, each polyolefin A block has an ethylene content of greater than 99 mol % based on the total moles of the monomers of polyolefin A. More preferably, each polyolefin A block has an ethylene content of greater than 99.5 mol %. Ideally, each polyolefin A block has an ethylene content of greater than 99.9 mol %. Preferably, each polyolefin A block has a degree of crystallinity greater than 50%, more preferably greater than 60%, and ideally greater than 70%. Often, at least one polyolefin A block comprises units derived from cyclooctene or cyclopentene monomer.

Polyolefin A Prepolymer

Typically, a polyolefin A prepolymer is synthesized via Ring Opening Metathesis Polymerization (ROMP) of one or more propagating strained cyclic olefins, such as cyclopentene, cycloheptene, cyclooctene, cyclodecene, and cyclododecene, preferably cyclooctene or cyclopentene monomer, in the presence of a chain transferring agent (CTA) and a catalyst. Preferably, the polyolefin A prepolymer produced via ROMP comprises hydroxyl, carboxy, or bromo-terminated polycyclooctene, ideally bromo-terminated polycyclooctene.

Suitable CTAs include, but are not limited to, bi-functional alkenes. The bi-functional alkenes can be any bi-functional alkenes that are capable of terminating the metathesis ring opening polymerization with a cyclic olefin. Preferably, the bi-functional alkene is a $C_3$ to $C_{10}$ alkene. Often, the bi-functional alkene is halogenated. Illustrative bi-functional alkenes include, for example, 1,4-diacetoxy-2-butene, 1,4-dibromo-2-butene, 1,4-dichloro-2-butene, maleic acid, and 9-octadecene-1,18-diol, ideally 1,4-dibromo-2-butene.

The concentration of the one or more propagating cyclic olefins and one or more terminating bi-functional alkenes used in the process of this disclosure can vary over a wide range and need only be concentrations sufficient to form the telechelic hydrocarbon polymer. The one or more cyclic olefins and one or more bi-functional alkenes can be present in a molar concentration ratio (cyclic olefin/bi-functional alkene) of from 5 to 2500, preferably from 10 to 500, and more preferably from 15 to 100.

The metathesis catalyst can be any catalyst suitable for catalyzing the metathesis polymerization. An illustrative metathesis catalyst useful in the process of this disclosure is a Grubbs second generation catalyst. The catalysts are conventional materials known in the art and commercially available.

The concentration of the metathesis catalyst used in the process of this disclosure can vary over a wide range and need only be a concentration sufficient to catalyze the polymerization. The metathesis catalyst can be present in an amount of from 0.001 wt % to 1 wt %, preferably from 0.01 wt % to 0.5 wt %, and more preferably from 0.01 wt % to 0.2 wt %.

Metathesis polymerization conditions for the reaction of the one or more cyclic olefins with one or more bi-functional alkene CTAs, such as temperature, pressure and contact time, may also vary greatly and any suitable combination of such conditions may be employed herein. The reaction temperature may range between 20° C. to 150° C., and preferably between 30° C. to 125° C., and more preferably between 40° C. to 100° C. Normally the reaction is carried out under ambient pressure and the contact time may vary from a matter of seconds or minutes to a few hours or greater. The reactants can be added to the reaction mixture or combined in any order. The stir time employed can range from 2 min to 24 hours, preferably from 30 min to 12 hours, and more preferably from 1 to 8 hours. Suitable metathesis polymerization conditions and reagents are more fully described in US 2013/0131297, which is hereby incorporated by reference in its entirety.

The produced polyolefin A prepolymer preferably has an Mn ranging from 2,000 g/mol to 100,000 g/mol, more preferably ranging from 3,000 to 50,000, and ideally ranging from 4,000 g/mol to 10,000 g/mol. Typically, the molecular weight distribution ranges from 1 to 6. Preferably, the molecular weight distribution is less than 5, more preferably less than 4, and ideally less than 3.

Other reactions subsequent to ROMP with CTA, for example, hydrolysis, may also be employed to convert the telechelic chain ends to desirable functional groups, for example, from ester to hydroxyl. Such reactions may be carried out by conventional methods known in the art.

Amorphous Polyolefin B Block(s)

Preferably, the amorphous polyolefin B block(s) of the multiblock copolymer comprise a copolymer of ethylene and a $C_3$ to $C_{10}$ alpha-olefin, ideally wherein the alpha-olefin is 1-propyelen, 1-butene, 1-hexene, or 1-octene. Preferably, each polyolefin B block has an ethylene content ranging from 30 mol % to 70 mol % based on the total moles of the monomers of polyolefin B. More preferably, each polyolefin B block has an ethylene content ranging from 40 mol % to 65 mol %. Ideally, each polyolefin B block has an ethylene content ranging from 45 mol % to 60 mol %. Preferably, each polyolefin B block has a degree of crystallinity less than 10%, more preferably less than 5%, and ideally less than 3%. Often, at least one polyolefin B block comprises units derived from butadiene or isoprene monomer.

Polyolefin B Prepolymer

Typically, a polyolefin B prepolymer is synthesized via the anionic polymerization of butadiene or isoprene monomer. Preferably, the polyolefin B prepolymer produced via anionic polymerization comprises polybutadiene or polyisoprene. Ideally, the polybutadiene or polyisoprene is then converted into hydroxyl terminated polybutadiene-diol or polyisoprene-diol via reaction with ethylene oxide.

Preferably, the anionic polymerization is dilithium initiated. Suitable dilithium initiators include, but are not limited to, organolithium compounds, more preferably a compound formed from diisopropenylbenze and a tertiary alkyl lithium compound, for example, m-di-(1-methyl-3,3,-dimethylbutyllithio)benzene.

Depending upon the reactivity of the reagents used and the polymerization conditions, the anionic polymerization process can be run at temperatures varying from about 0° C. to about 200° C. as limited by thermal stability of the monomer, the dilithium initiator, and the polyolefin B prepolymer product. Normally, temperatures between about 0° C. and about 150° C. are preferred, more preferably from 30° C. to 100° C., ideally from 40° C. to 60° C. Polymerization times may range between several seconds and a few days, more preferably ranging from one to ten hours.

A wide range of solvents and/or solvent blends may be used as the medium in which the anionic polymerization is run. Solvents that are particularly suited for solvating the dilithium initiator include, but are not limited to tetrahydrofuran (THF) and diethyl ether. A high polarity solvent is preferred for synthesizing polybutadiene with a vinyl content, i.e., 1,2-addition content, of preferably greater than 25 mol %, and ideally greater than 35 mol %.

Alternatively to the synthesis methods described above, the polyolefin B prepolymer can comprise commercially available polybutadiene or polyisoprene, more preferably hydroxyl terminated polybutadiene-diol or hydroxyl terminated polyisoprene-diol. Particularly useful hydroxyl terminated polybutadiene-diols include Hypro™ HTB polyols, more particularly grade 2800X95 HTB, commercially available from Emerald Performance Materials, LLC and Krasol™ resins, more particularly grade LBH-3000, commercially available from TOTAL Cray Valley, a part of TOTAL Petrochemicals & Refining, Inc.

The produced or obtained polylefin B prepolymer preferably has an Mn ranging from 1,000 g/mol to 100,000 g/mol, more preferably ranging from 1,500 to 50,000, and ideally ranging from 2,000 g/mol to 10,000 g/mol. Typically, the molecular weight distribution ranges from 1 to 6. Preferably, the molecular weight distribution is less than 5, more preferably less than 4, and ideally less than 3.

Typically upon hydrogenation, any produced or obtained polybutadiene of the polylefin B prepolymer is converted to a poly(ethylene-r-butene) random copolymer, any produced or obtained polyisoprene of the polylefin B prepolymer is converted to a poly(ethylene-alt-propylene) alternating ethylene-propylene copolymer having an ethylene content of 50 mol %, and any 1,2-added butadiene unit of the polylefin B prepolymer becomes functionally equivalent to butene comonomer.

Coupling of Polyolefin A & Polyolefin B Prepolymers

Preferably, the polyolefin A and polyolefin B prepolymers are coupled via one of click chemistry, condensation chemistry, and Williamson ether synthesis to produce a multiblock copolymer. Ideally, the resulting multiblock copolymer formed from coupling the prepolymers comprises poly(cyclooctene-b-butadiene).

Typically where the coupling is performed via click chemistry, a terminal functional group on one of the polyolefin A and B prepolymers, more preferably a halogen atom, is displaced by an azide. Often, the azide is derived from sodium azide. In aspects where the displaced terminal group is a halogen atom, the polyolefin A and B prepolymers are preferably joined via an azide-alkyne Huisen cycloaddition reaction. Such reactions may be carried out by conventional methods known in the art. Typically, the cycloaddition reaction is performed in the presence of a copper catalyst at a temperature ranging from about 0° C. to about 200° C. Ideally, the displaced terminal group in the cycloaddition reaction is a bromine atom present in telechelic bromo-terminated polycyclooctene.

Typically, where the coupling is performed via condensation chemistry, the polyolefin prepolymer is carboxy terminated, the polyolefin B prepolymer is hydroxyl terminated, and copolymer formed from coupling the prepolymers comprises a polyester. Such condensation reactions may be carried out by conventional methods known in the art. Typically, the condensation reaction is run at a temperature above 200° C. and is initiated by the degradation of an organic peroxide, preferably benzoyl peroxide or methyl ethyl ketone peroxide.

Typically, where the coupling is performed via Williamson ether synthesis, a terminal halogen atom on the polyolefin A prepolymer is displaced by an alkoxide nucleophile on the polyolefin B prepolymer under basic conditions. Suitable bases are those capable of deprotonation but that are themselves poor nucleophiles (i.e., "non-nucleophilic bases"). Representative bases include bulky amines, phosphines, and heterocycles (e.g., N,N-diisopropylethylamine, 1,8-diazabicycloundec-7-ene, and 2,6-di-tert-butylpyridine). Other suitable inorganic bases include, but are not limited to, sodium or potassium hydride/tert-butoxide, metal carbonates or oxides, lithium diisopropylamide, sodium or potassium bis(trimethylsilyl)amide, lithium tetramethylpiperidide, calcium hydroxide, sodium hydroxide, sodium amide, titanium chloride, and magnesium hydroxide.

Normally, for Williamson ether synthesis, temperatures between about 30° C. and about 150° C. are preferred, more preferably from 40° C. to 120° C., most preferably from 50° C. to 100° C. Often, the solvent is selected from the group consisting of $C_6$ to $C_8$ aliphatic hydrocarbons, $C_6$ to $C_{20}$ aryls, halogenated $C_6$ to $C_{20}$ aryls, and heterocyclic hydrocarbons, ideally THF. Reaction times may range between several seconds and a few days, more preferably ranging from one to ten hours.

Hydrogenation of Coupled Prepolymers

Preferably, the multiblock copolymer comprising the coupled polyolefin A and polyolefin B prepolymers is hydrogenated to produce an inventive multiblock copolymer comprising alternating blocks of a crystalline polyolefin A and an amorphous polyolefin B that is substantially saturated. Such hydrogenation may be carried out by any conventional methods known in the art. For purposes of the present disclosure, "substantially saturated" as it refers to the multiblock copolymer means that the copolymer includes on average fewer than 5 double bonds, or fewer than 3 double bonds, or fewer than 1 double bonds, or fewer than 0.5 double bond per one hundred carbon in the copolymer chain.

Hydrogenation can be carried out in the process of the present disclosure by any known catalysis system, including heterogeneous systems and soluble systems.

Preferably, a transition metal based catalyst, more preferably a ruthenium (Ru) or rhodium (Rh) based catalyst, ideally Wilkinson's catalyst (chlorotris(triphenylphosphine) rhodium(I)), is used to catalyze the hydrogenation.

Alternatively, the hydrogenation may be performed in the absence of a catalyst. Non-catalyzed hydrogenation is preferably performed using an inorganic reducing agent, preferably a diimide. Preferably, the diimide is generated through thermal treatment of an arenesulfonylhydrazide, ideally p-toluenesulfonulhydrazide.

The hydrogenation reaction herein is normally accomplished at a temperature high enough to prevent hydrogenated polyolefins from crystallizing in solution, preferably at a temperature ranging from 40° C. to 160° C. and ideally from 60° C. to 150° C. Different substrates being hydrogenated will require different optimum temperatures, which can be determined by experimentation. The initial hydrogenation pressures may range up to 3,000 psi partial pressure, at least part of which is present due to the hydrogen. Pressures from 1 to 7500 psig are suitable. Preferred pressures are up to 2000 psig, and most preferred pressures are from 100 to 1000 psig are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes.

The ratio of catalyst to material being hydrogenated is generally not critical and may vary widely within the scope of the disclosure. Molar ratios of catalyst to material being hydrogenated between 1:1000 and 10:1 are found to be satisfactory; higher and lower ratios, however, are possible.

If desired, the hydrogenation process may be carried out in the presence of an inert diluent, for example a paraffinic or cycloparaffinic hydrocarbon.

A wide range of solvents and/or solvent blends may be used as the medium in which the hydrogenation is performed. Suitable solvents include: saturated cyclic hydrocarbons, such as cyclohexane, methylcyclohexane, and decalin; aromatic hydrocarbons, such as benzene, toluene, and xylene; cyclic ethers, such as dioxane; parafiinic hydrocarbons, such as isooctanes, isoheptanes, and normal heptane; and hydroaromatic hydrocarbons, such as tetralin.

HDPE Resin Based Polymer Blends

Preferably, the alternating crystalline-amorphous polyolefin based multiblock copolymers produced in accordance with this invention can be mixed/blended with an HDPE resin to form a polymer blend at a concentration ranging from 2.5 to 60 wt % based on the weight of the polymer blend, preferably from 5 to 55 wt %, preferably from 10 to 50 wt %. Preferably, the HDPE resin has a melt index ranging from 0.10 g/10 min to 45 g/10 min, as measured in accordance with ASTM-131238 condition E, and a density greater than or equal to about 0.945 g/cm$^3$, more preferably greater than or equal to about 0.950 g/cm$^3$, and ideally greater than or equal to about 0.954 g/cm$^3$. Suitable HDPE resin can be produced by conventional methods known in the art, or purchased from ExxonMobil Chemical Company, among others. Particularly useful HDPE resins includes Paxon™ HDPE resins, ideally grade AL55-003, having a melt index of 0.3 g/10 min and a density of 0.954 g/cm$^3$.

Mixing/blending of the components to form the elastomeric nanocomposite composition and/or compounding of the elastomeric nanocomposite composition can be carried out by combining the components in any suitable internal mixing device such as a Banbury™ mixer, Brabender™ mixer or preferably a mixer/extruder. Preferably, a twin screw extruder is used for extrusion mixing, ideally a co-rotating intermeshing twin screw extruder.

Suitable mixing rates can range from about 10 RPM to about 8,500 RPM. Preferably, the mixing rate can range from a low of about 10 RPM, 30 RPM, or 50 RPM to a high of about 500 RPM, 2,500 RPM, or 5,000 RPM. More preferably, the mixing rate can range from a low of about 10 RPM, 30 RPM, or 50 RPM to a high of about 200 RPM, 500 RPM, or 1,000 RPM. Preferably, the blending/mixing is performed at a rate noted above for 20 seconds to 600 seconds, more preferably from 30 seconds to 300 seconds, and ideally from 60 seconds to 180 seconds.

In any embodiment, the mixing temperature can range from about 120° C. to about 300° C. In any embodiment, the mixing temperature can range from a low of about 120° C., 130° C., or 140° C. to a high of about 250° C., 270° C., or 300° C. Preferably, the mixing temperature can range from a low of about 150° C., 165° C., or 180° C. to a high of about 200° C., 270° C., or 300° C.

Often, the produced HDPE resin based polymer blend can include one or more other components and additives customarily used in polymer blends, especially those customarily used in the formation of films, such as antioxidants pigments, dyes, antistatic agents, slip agents, foaming agents, heat stabilizers, light stabilizers, inorganic fillers, organic fillers or a combination thereof. Especially preferred additional components include Irganox™ 1076 and Irgafos™ 168 antioxidants, both obtainable from BASF SE. Typically, any additional components are present at a concentration ranging from 0.05 wt % to 10 wt % based on the weight of the polymer blend, preferably from 0.5 wt % to 5 wt %, and ideally from 0.7 wt % to 1.0 wt %.

The polymer blend typically comprises a plurality of crystallites within the one or more crystalline blocks. Preferably, at least 15%, more preferably 30%, and ideally 35% of the crystallites of the polymer blend have a thickness of 15 nm or less, more preferably 13 nm or less, and ideally 11 nm or less.

Preferably, the polymer blend has enhanced ductility and toughness over that of the neat HPDPE resin, as measured in accordance with ASTM D-638. For example, the polymer blend preferably has an elongation to break 400% to 1500%, more preferably ranging from 500% to 1500%, and ideally ranging from 600% to 1500%. In addition to this enhanced ductility and toughness, the polymer blend preferably has mechanical strength properties comparable to that of the neat HDPE resin as measured in accordance with ASTM D-638. For example, the polymer blend preferably has a yield stress ranging from 15 MPa to 40 MPa, more preferably ranging from 20 Mpa to 40 MPa, and ideally ranging from 25 MPa to 40 MPa, and a Young's modulus preferably ranging from 350 MPa to 1,000 MPa, more preferably ranging from 500 MPa to 1,000 MPa, and ideally ranging from about 600 MPa to 1,000 MPa.

The polymer blends described herein may be incorporated into articles, such as films, sheets, molded parts and the like. Exemplary end uses are monolayer or multilayer films, film-based products, articles formed by molding techniques, for example, injection or blow molding, extrusion coating, foaming, casting, and combinations thereof. End uses also include products made from films, for example, bags, packaging, and combinations thereof, or any other application where a film having a combination of high mechanical strength, ductility, and toughness would be advantageous.

The various descriptive elements and numerical ranges disclosed herein for the inventive alternating crystalline-amorphous polyolefin based multiblock copolymers and process to make such multiblock copolymers can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Example 1

Synthesis A Prepolymer

In a nitrogen filled glovebox, cyclooctene (25 g, 0.227 mol) and 1,4-dibromo-2-butene (0.8 g, 3.74 mmol) were mixed with 100 mL of toluene solvent in a round bottomed flask. The mixture was heated to 50° C. while stirring, forming a homogeneous solution. A second generation Grubbs' catalyst (0.005 gram) was added to start the reaction. The reaction was run for two hours at 50° C. and then cooled and quenched using vinyl ethyl ether. The toluene solvent was removed under vacuum and, yielding a solid that was washed with methanol and dried under vacuum overnight. The resulting produced polyolefin A prepolymer (telechelic bromo-terminated polycyclooctene) was analyzed by $^1$H-NMR and found to have a number average molecular weight (Mn) of 6,300 g/mol.

Coupling of Polyolefin A & Polyolefin B Prepolymers

The polyolefin B prepolymer used for Example 1 was 2800X95 HTB grade Hypro™ hydroxyl-terminated polybutadiene-diol obtained from Emerald Performance Materials, LLC having an Mn of approximately 2,800 g/mol and a hydroxyl content of 0.839 mmol of hydroxyl per gram.

To couple the polyolefin A and polyolefin B prepolymers, polyolefin B prepolymer (2.1 g) was dissolved in tetrahydrofuran (THF), in a round bottomed flask, in a nitrogen filled glovebox. Sodium hydride (NaH) (0.2 g, 8.33 mmol) was added and the mixture was stirred at ambient temperature for one hour. Tetrabutylammonium bidisulfate (0.03 gram) was added. A solution of polyolefin A prepolymer in THF (4.65 g polyolefin A prepolymer) was then added dropwise by an addition funnel. The reaction mixture was heated to and maintained at 60° C. for three days, then cooled and quenched using methanol. The product was precipitated out of methanol and dried under vacuum overnight. The resulting produced coupled multiblock poly(cyclooctene-b-butadiene) copolymer was analyzed by $^1$H-NMR and found to have a number average block number of about 6, with 3 cyclooctene blocks and 3 butadiene blocks.

Hydrogenation of Coupled Prepolymers

The multiblock poly(cyclooctene-b-butadiene) copolymer was mixed with p-toluenesulfonulhydrazide (30 g, 0.161 mole), tributylamine (30 g, 0.162 mole), 2,6-Di-tert-butyl-4-methylphenol (0.01 g, 0.454 mmol) and 200 mL of xylenes solvent in a round bottomed flask. The mixture was heated to reflux while stirring under nitrogen protection, allowed to reflux overnight, and then cooled. The xylenes solvent was removed under vacuum, yielding a solid that was washed with methanol three times and dried under vacuum overnight.

The resulting hydrogenated product multiblock polyethylene (hereinafter, "MPE1") was analyzed by triple detector GPC and found to have an Mn of 10,600 g/mol, a weight average molecular weight (Mw) of 166,600 g/mol, and a molecular weight distribution (Mw/Mn) of 15.7. From these molecular weight values, it was determined that MPE1 had a number average block number of 2 and a weight average block number of 36. The broad distributions in molecular weight and block number exhibited by MPE1 were expected due to the statistical nature of the reaction employed for coupling the crystalline (polyolefin A) and amorphous (polyolefin B) blocks.

Example 2

Synthesis of Polyolefin A Prepolymer

The same procedure described in Example 1 for the synthesis of the polyolefin A prepolymer was followed in Example 2. The resulting produced polyolefin A prepolymer (telechelic bromo terminated polycyclooctene) was analyzed by $^1$H-NMR and found to have an Mn of 6,400 g/mol.

Coupling of Polyolefin A & Polyolefin B Prepolymers

The polyolefin B prepolymer used for Example 2 was grade LBH-3000 Krasol™ polybutadiene-diol resin, commercially available from TOTAL Cray Valley, a part of TOTAL Petrochemicals & Refining, Inc. The polyolefin B prepolymer had an Mn of approximately 3,000 g/mol and a hydroxyl content ranging between 0.52 to 0.8 of hydroxyl per gram.

To couple the polyolefin A and polyolefin B prepolymers, both prepolymers were dried in a vacuum oven and then placed under vacuum overnight in a glovebox antechamber. Anhydrous THF was brought into the glovebox and degassed with nitrogen. Polyolefin B prepolymer (4.545 g, 1.515 mmol) was brought into the nitrogen filled glovebox and dissolved in the dried anhydrous THF in a round bottomed flask. NaH (0.557 g, 23.2 mmol) was added and the resulting mixture was stirred at ambient temperature for 90 minutes. A solution of polyolefin A prepolymer (9.853 g, 1.53 mmol) in THF was then added to form a reaction mixture. The flask was then sealed, brought out of the glovebox, and placed under nitrogen flow.

The reaction mixture was then heated to 60° C. while stirring and allowed to react for three days. Afterward, the reaction mixture was cooled to 0° C. and an additional 100 mL of THF was added. 5 mL of methanol was added to quench the unreacted NaH. The reaction mixture was stirred at 0° C. for one hour, after which the mixture was poured into a separation funnel and slowly added into 3 L of methanol. The resulting mixture was stirred for 40 minutes and then filtered. The filtrate was collected dried under vacuum. The resulting produced coupled multiblock poly(cyclooctene-b-butadiene) copolymer was analyzed by $^1$H-NMR and found to have a number average block number of about 6, with 3 cyclooctene blocks and 3 butadiene blocks.

Hydrogenation of Coupled Prepolymers

Wilkinson's catalyst was used to catalyze the hydrogenation of the coupled prepolymers comprising poly(cyclooctene-b-butadiene). The hydrogenation was conducted in a cyclohexane solvent at 70° C. in a 1 L reactor pressurized with 20 psig of hydrogen.

The resulting hydrogenated product multiblock polyethylene (hereinafter, "MPE2") was analyzed by triple detector GPC and found to have an Mn of 8,900 g/mol, an Mw of 55,140 g/mol, and an Mw/Mn of 6.2. From these molecular weight values, it was determined that MPE2 had a number average block number of 2 and a weight average block number of 12.

Characterization of MPE1 and MPE2

MPE1 and MPE2 were thermally analyzed to determine the crystallization and melting temperatures (Tc and Tm) as well as the degree of crystallinity (Xc) of these multiblock copolymers. These Tc, Tm, and Xc measurements were carried out in a Q2000 differential scanning calorimeter (DSC) obtained from TA Instruments-Waters LLC. The Q2000 DSC had a low temperature operation limit of −90° C., a high temperature operation limit of 400° C., and was equipped with a liquid nitrogen accessory for cooling to subzero temperatures.

In addition, the lamellar spacing of each of MPE1 and MPE2 was determined using microscopic methods from bimodal amplitude and tapping phase atomic force microscopy (AFM) images of these multiblock copolymers.

The results of these Tc, Tm, Xc, and lamellar spacing measurements for MPE1 and MPE2 are listed below in Table 1.

TABLE 1

| Multiblock Copolymer | Tm (° C.) | Tc (° C.) | Xc (%) | Lamellar Spacing (nm) |
| --- | --- | --- | --- | --- |
| MPE1 | 124 | 114.5 | 51 | 15.5 |
| MPE2 | 123 | 114 | 45 | 12.5 |

As shown above in Table 1, MPE1 and MPE2 exhibited slight differences in Xc and Tm, likely caused by the broader molecular weight distribution of MPE1 relative to MPE2.

The equilibrium melting temperature of MPE2 after thermal annealing was determined using the Q2000 DSC as 127° C. In linear polyethylene, this equilibrium melting temperature corresponds to a crystallite having a lamellar thickness of 150 carbon atoms (11 nm), as calculated using the Thomson-Gibbs equation. Such a crystallite having a lamellar thickness of 150 carbon atoms is expected to have two folds in the crystalline block. Thus, from the observed equilibrium melting temperature, it was estimated that each crystalline block of MPE2 was folded back and forth to have three sections, with each section consisting of 150 carbon atoms. Assuming that the amorphous block of MPE2 formed random coils in the final solid copolymer, it was estimated that the amorphous region, i.e., the interlamellar region, thickness of MPE2 should be around 2.3 nm. Accordingly, the predicted lamellar spacing of MPE2 based on its equilibrium melting temperature was 13.3 nm.

As shown in Table 1, the measured lamellar spacing values as determined using bimodal amplitude and tapping phase, AFM images of MPE1 and MPE2 were 15.5 nm and 12.5 nm, respectively. The measured lamellar spacing value of 12.5 nm for MPE2 was close to the predicted value of 13.3 nm, suggesting that the predicted lamellar structure of MPE2 from the thermal equilibrium melting temperature data was accurate. Accordingly, based on the thermal and microscopic data, it was determined that the inventive multiblock copolymers of the invention form stacked lamellae having LLDPE type dimensions, for example, a lamellar thickness of 11 to 12 nm More specifically, it was determined that each crystalline block of the copolymers folds back and forth to have three sections, with each section consisting of around 150 carbon atoms.

Blends of MPE1 and MPE2 with HDPE Resin

The HDPE resin used to form polymer blends with MPE1 and MPE2 had a melt index of 0.3 g/10 min and a density of 0.954 g/cm$^3$. This resin is commercially available as grade AL55-003 Paxon™ resin from ExxonMobil Chemical Company.

MPE1 was first blended with the HDPE resin at a concentration of 2.5 wt %, based on the weight of the polymer blend. This concentration of 2.5 wt % was selected to be above the overlapping concentration of MPE1, meaning that MPE1 would not exist as an individual non-overlapping coil in the polymer blend. However, there were no significant measured changes in the properties of the resulting polymer blend in comparison with the properties of the neat HDPE resin, suggesting that a concentration higher than the overlapping concentration of the multiblock copolymer would be necessary to have a discernible impact on the HDPE resin crystallization. Hence, a concentration of at least 10 wt % of the multiblock copolymer was used in all subsequent polymer blends.

Four examples of polymer blends were prepared by blending MPE2 with the HDPE resin. The relative weight percentages of MPE2 and HDPE resin for each of the four example blends are listed in Table 2, ranging from a 50 wt % MPE2 to 90 wt % MPE2. Two comparative blends comprising one of neat MPE2 and the neat HDPE resin were also prepared.

A stabilizer mixture comprising a blend of equal parts (by weight) Irganox™ 1076 and Irgafos™ 168 antioxidants, both obtained from BASF SE, was added to all example and comparative blends at a concentration of 0.1 wt %. Next, the components for each of the four example blends were extrusion mixed using an Xplore™ MC5 conical intermeshing miniature twin screw extruder available from Xplore Instruments BV at 185° C. and 50 RPM for 3 minutes. The two comparative blends one of neat MPE2 and neat HDPE resin were also formed by sending these materials through the twin screw extruder at the same conditions as the example blends.

Tapping phase AFM was applied to the four example blends and two comparative blends in order to examine the meso-structure of each blend for the identification of onset of phase co-continuity, from which the continuity phase of each blend was determined. The four example blends and two comparative blends were then molded into tensile bars via injection/compression molding. Mechanical properties of these tensile bars were measured using an Instron™ tensile tester as measured in accordance with ASTM D-638. The mechanical properties and continuity phase results obtained from these tests for each blend are summarized in Table 2.

TABLE 2

| Blend | HDPE (wt %) | MPE2 (wt %) | Young's Modulus (MPa) | Yield Stress (MPa) | Elongation to break (%) | Continuity Phase |
|---|---|---|---|---|---|---|
| Comparative Blend 1 | 0 | 100 | 144 | 12 | 183 | MPE2 |
| Example Blend 1 | 50 | 50 | 368 | 19 | 802 | Co-continuous |
| Example Blend 2 | 70 | 30 | 449 | 22 | 805 | Co-continuous |
| Example Blend 3 | 80 | 20 | 542 | 25 | 803 | Co-continuous |
| Example Blend 4 | 90 | 10 | 601 | 26 | 797 | HDPE |
| Comparative Blend 2 | 100 | 0 | 610 | 26 | 239 | HDPE |

As seen above in Table 2, the neat MPE2 resin of comparative blend 1 exhibited a high elongation to break due to its low molecular weight whereas the neat HDPE resin of comparative blend 2 exhibited a low elongation to break due to its thick crystallites and low tie chain concentrations. Each of example blends 1-4 exhibited a marked increase in elongation to break over the neat HDPE resin of comparative blend 2. As can also be seen from Table 2, by adding the multiblock copolymer at a concentration of only 10 wt %, it was possible to significantly raise the elongation to break of the HDPE resin without a substantial decline in Young's (tensile) modulus or yield strength.

The four example blends and the two comparative blends were also subjected to thermal segregation studies to separate the crystallite populations within each blend based on crystallite size. Thermal segregation studies were performed using a PerkinElmer™ Diamond™ DSC assembled with an intra-cooler.

A sample mass between approximately 2 to 5 mg of each blend was first encapsulated in the aluminum pan of the DSC, heated to 180° C., and held at that temperature for three minutes to destroy its thermal history. The heated blends were then crystallized by a step isothermal technique wherein the blend was cooled in 5° C. increments and annealed for 1.5 hours after each incremental temperature decline. The temperature range over which this step isothermal was performed was determined from the breadth of the melting range of each blend as determined from a separate experiment using the DSC performed at a heating rate of 10° C./min. The step isothermally crystallized blends were then heated using the DSC at a rate of 10° C./min, and the sequence heterogeneity of each blend was determined from analyzing the multiple melting peaks observed on the resulting DSC curve. From these data, the percent of the crystallite populations in each of the polymer blends that were of a similar thickness as the average crystallite in neat MPE2 were determined, as summarized in Table 3.

TABLE 3

| Blend | Percent MPE2-Sized Crystallites |
|---|---|
| Comparative Blend 1 | 100 |
| Example Blend 1 | 45 |
| Example Blend 2 | 38 |
| Example Blend 3 | 35 |
| Example Blend 4 | 37 |
| Comparative Blend 2 | 0 |

As seen from Table 3, example blend 4 exhibited a crystallite population having 37% of crystallites with a thickness comparable to that of the average crystallite in neat MPE2. This result was obtained even though MPE2 was only present in example blend 4 at a concentration of 10 wt %, corresponding to comprising around 5% of the final blend crystallite population. The observed result that 37% of crystallites in the final blend had a thickness comparable to that of the average crystallite in neat MPE2 as opposed to 5% therefore suggests that MPE2 acted as a template during crystallization of the HDPE resin, thereby leading to the formation of a substantial proportion of HPDE crystallites having reduced crystallite thickness. Such a reduction crystallite thickness is expected to correspond to an increase in tie chain concentration. This expected increase in tie chain concentration may explain the marked increases in elongation to break of example blends 1-4 over that of the neat HDPE of comparative blend 2, as shown in Table 2.

Having described and demonstrated the various aspects of the inventive alternating crystalline-amorphous polyolefin based multiblock copolymers, described here in numbered paragraphs is:

P1. An alternating crystalline-amorphous multiblock copolymer comprising one or more blocks of a crystalline HDPE A and one or more blocks of an amorphous polyolefin B, wherein polyolefin A comprises ethylene and polyolefin B comprises ethylene and a $C_3$ to $C_{10}$ alpha-olefin, and wherein at least 90% of crystallites in the multiblock copolymer have a thickness of 15 nm or less.

P2. The multiblock copolymer of previous numbered paragraph 1, wherein polyolefin A comprises units derived from cyclooctene, and wherein polyolefin B comprises units derived from butadiene.

P3. The multiblock copolymer of any one of the previous numbered paragraphs, wherein polyolefin A comprises high density polyethylene (HDPE).

P4. The multiblock copolymer of previous numbered paragraph 3, wherein polyolefin A has an ethylene content of greater than 99 mol % based on the total moles of the monomers of polyolefin A.

P5. The multiblock copolymer of any one of the previous numbered paragraphs, wherein polyolefin B has a degree of crystallinity of less than 10%.

P6. The multiblock copolymer of any one of the previous numbered paragraphs, wherein the alpha-olefin of polyolefin B is 1-butene.

P7. The multiblock copolymer of any one of the previous numbered paragraphs, wherein polyolefin B has an ethylene content ranging from 30 mol % to 70 mol % based on the total moles of the monomers of polyolefin B.

P8. The multiblock copolymer of any one of the previous numbered paragraphs, wherein the one or more blocks of polyolefin A form 5 wt % to 90 wt % of the multiblock copolymer.

P9. The multiblock copolymer of any one of the previous numbered paragraphs, wherein the one or more blocks of polyolefin A have a weight average molecular weight ranging from 1,000 to 250,000 g/mol, and wherein the one or more blocks of polyolefin B have a weight average molecular weight ranging from 1,000 to 250,000 g/mol.

P10. A method of synthesizing an alternating crystalline-amorphous multiblock copolymer comprising one or more blocks of a crystalline polyolefin A and one or more blocks of an amorphous polyolefin B, the method comprising: coupling a polyolefin A prepolymer and a polyolefin B prepolymer via at least one of click chemistry, condensation chemistry, and/or Williamson ether synthesis, wherein the polyolefin A prepolymer comprises polycyclooctene, and wherein the polyolefin B prepolymer comprises polybutadiene; and hydrogenating the coupled polyolefin A and polyolefin B prepolymers.

P11. The method of previous numbered paragraph 10, wherein the polyolefin A prepolymer is synthesized via Ring Opening Metathesis Polymerization (ROMP) of cyclooctene in the presence of a chain transferring agent (CTA).

P12. The method of previous numbered paragraph 11, wherein the CTA is a halogenated $C_3$ to $C_{10}$ bi-functional alkene.

P13. The method of previous numbered paragraph 12, wherein the polyolefin A prepolymer comprises telechelic bromo-terminated polycyclooctene.

P14. The method of any one of previous numbered paragraphs 10 to 13, wherein the polyolefin B prepolymer comprises dilithium initiated, anionic polymerized polybutadiene.

P15. The method of any one of previous numbered paragraphs 10 to 14, wherein the coupling is performed via Williamson ether synthesis in a solvent under basic conditions at a temperature ranging from 30° C. to 150° C., and wherein the solvent is selected from the group consisting of $C_6$ to $C_8$ aliphatic hydrocarbons, $C_6$ to $C_{20}$ aryls, halogenated $C_6$ to $C_{20}$ aryls, and heterocyclic hydrocarbons.

P16. A method of forming a polymer blend, comprising blending HDPE with an alternating crystalline-amorphous multiblock copolymer comprising one or more blocks of a crystalline polyolefin A and one or more blocks of an amorphous polyolefin B, wherein polyolefin A comprises ethylene and polyolefin B comprises ethylene and a $C_3$ to $C_{10}$ alpha-olefin, and wherein at least 90% of crystallites in the multiblock copolymer have a thickness of 15 nm or less, wherein the multiblock copolymer is present at from 2.5 wt % to 60 wt % based on the weight of the polymer blend.

P17. The method of previous numbered paragraph 16, wherein the blending comprises extrusion mixing of the HDPE and the multiblock copolymer at a temperature ranging from 120° C. to 300° C.

P18. A polymer blend comprising: HDPE; and an alternating crystalline-amorphous multiblock copolymer comprising one or more blocks of a crystalline polyolefin A and or more blocks of an amorphous polyolefin B, wherein polyolefin A comprises ethylene and wherein polyolefin B comprises ethylene and a $C_3$ to $C_{10}$ alpha-olefin, wherein the multiblock copolymer is present at from 2.5 wt % to 60 wt % based on the weight of the polymer blend, and wherein at least 15% of crystallites in the polymer blend have a thickness of 15 nm or less.

P19. The polymer blend of previous numbered paragraph 18, wherein polyolefin A comprises HDPE.

P20. The polymer blend of previous numbered paragraph 19, wherein polyolefin A has an ethylene content of greater than 99 mol % based on the total moles of the monomers of polyolefin A.

P21. The polymer blend of any one of previous numbered paragraphs 18 to 20, wherein the alpha-olefin of polyolefin B is 1-butene and wherein polyolefin B has a degree of crystallinity of less than 10%.

P22. The polymer blend of any one of previous numbered paragraphs 18 to 21, wherein the blend has a yield stress greater than 15 MPa.

P23. The polymer blend of any one of previous numbered paragraphs 18 to 22, wherein the blend has an elongation at break greater than 400%.

P24. The polymer blend of any one of previous numbered paragraphs 18 to 23, wherein the blend has a Young's modulus greater than 350 MPa.

P25. A film having one or more layers, wherein at least one layer comprises the polymer blend of any one of previous numbered paragraphs 18 to 24.

Also disclosed herein is the use of the polymer blend described herein in a monolayer or multilayer film.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated. The term "comprising" is synonymous with the term "including". Likewise whenever a composition, an element or a group of components is preceded with the transitional phrase "comprising", it is understood that we also contemplate the same composition or group of components with transitional phrases "consisting essentially of" "consisting of", "selected from the group of consisting of" or "is" preceding the recitation of the composition, component, or components, and vice versa.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. An alternating crystalline-amorphous multiblock copolymer comprising:
   one or more blocks of a polyolefin A and one or more blocks of an amorphous polyolefin B,
   wherein polyolefin A comprises ethylene and polyolefin B comprises ethylene and a $C_3$ to $C_{10}$ alpha-olefin,
   and wherein at least 90% of crystallites in the multiblock copolymer have a thickness of 15 nm or less.

2. The multiblock copolymer of claim 1, wherein polyolefin A comprises units derived from cyclooctene, and wherein polyolefin B comprises units derived from butadiene.

3. The multiblock copolymer of claim 1, wherein the polyolefin A has a melt index ranging from 0.10 g/10 min to 45 g/10 min, as measured in accordance with ASTM-131238 condition E.

4. The multiblock copolymer of claim 3, wherein polyolefin A has an ethylene content of greater than 99 mol % based on the total moles of the monomers of polyolefin A.

5. The multiblock copolymer of claim 1, wherein the alpha-olefin of polyolefin B is 1-butene.

6. The multiblock copolymer of claim 1, wherein polyolefin B has an ethylene content ranging from 30 mol % to 70 mol % based on the total moles of the monomers of polyolefin B.

7. The multiblock copolymer of claim 1, wherein the one or more blocks of polyolefin A form 5 wt % to 90 wt % of the multiblock copolymer.

8. The multiblock copolymer of claim 1,
   wherein the one or more blocks of polyolefin A have a weight average molecular weight ranging from 1,000 to 250,000 g/mol, and
   wherein the one or more blocks of polyolefin B have a weight average molecular weight ranging from 1,000 to 250,000 g/mol.

9. A method of synthesizing an alternating crystalline-amorphous multiblock copolymer comprising one or more blocks of a crystalline polyolefin A and one or more blocks of an amorphous polyolefin B, the method comprising:
   (a) coupling a polyolefin A prepolymer and a polyolefin B prepolymer via at least one of (i) click chemistry, (ii) condensation chemistry, and/or (iii) Williamson ether synthesis, wherein the polyolefin A prepolymer comprises polycyclooctene, and wherein the polyolefin B prepolymer comprises polybutadiene; and
   (b) hydrogenating the coupled polyolefin A and polyolefin B prepolymers.

10. The method of claim 9, wherein the polyolefin A prepolymer is synthesized via Ring Opening Metathesis Polymerization (ROMP) of cyclooctene in the presence of a chain transferring agent (CTA).

11. The method of claim 10, wherein the CTA is a halogenated $C_3$ to $C_{10}$ bi-functional alkene.

12. The method of claim 11, wherein the polyolefin A prepolymer comprises telechelic bromo-terminated polycyclooctene.

13. The method of claim 9, wherein the polyolefin B prepolymer comprises dilithium initiated, anionic polymerized polybutadiene.

14. The method of claim 9,
   wherein the coupling is performed via Williamson ether synthesis in a solvent under basic conditions at a temperature ranging from 30° C. to 150° C., and
   wherein the solvent is selected from the group consisting of $C_6$ to $C_8$ aliphatic hydrocarbons, $C_6$ to $C_{20}$ aryls, halogenated $C_6$ to $C_{20}$ aryls, and heterocyclic hydrocarbons.

15. A method of forming a polymer blend, comprising blending:
   a) high density polyethylene (HDPE); and
   b) an alternating crystalline-amorphous multiblock copolymer comprising:
      one or more blocks of a crystalline polyolefin A and one or more blocks of an amorphous polyolefin B,
      wherein polyolefin A comprises ethylene and polyolefin B comprises ethylene and a $C_3$ to $C_{10}$ alpha-olefin, and
      wherein at least 90% of crystallites in the multiblock copolymer have a thickness of 15 nm or less,
      wherein the multiblock copolymer is present at from 2.5 wt % to 60 wt % based on the weight of the polymer blend.

16. The method of claim 15, wherein the blending comprises extrusion mixing of the HDPE and the multiblock copolymer at a temperature ranging from 120° C. to 300° C.

17. A polymer blend comprising:
a) HDPE; and
b) an alternating crystalline-amorphous multiblock copolymer comprising:
one or more blocks of a crystalline polyolefin A and one or more blocks of an amorphous polyolefin B,
wherein polyolefin A comprises ethylene and polyolefin B comprises ethylene and a $C_3$ to $C_{10}$ alpha-olefin,
wherein the multiblock copolymer is present at from 2.5 wt % to 60 wt % based on the weight of the polymer blend, and
wherein at least 15% of crystallites in the polymer blend have a thickness of 15 nm or less.

18. The polymer blend of claim 17, wherein polyolefin A comprises HDPE.

19. The polymer blend of claim 18, wherein polyolefin A has an ethylene content of greater than 99 mol % based on the total moles of the monomers of polyolefin A.

20. The polymer blend of claim 17, wherein the alpha-olefin of polyolefin B is 1-butene, and wherein polyolefin B has a degree of crystallinity of less than 10%.

21. The polymer blend of claim 17, wherein the blend has a yield stress greater than 15 MPa.

22. The polymer blend of claim 17, wherein the blend has an elongation at break greater than 400%.

23. The polymer blend of claim 17, wherein the blend has a Young's modulus greater than 350 MPa.

24. A film having one or more layers, wherein at least one layer comprises the polymer blend of claim 17.

* * * * *